UNITED STATES PATENT OFFICE.

WALTER GLAESER, OF BROOKLYN, NEW YORK, ASSIGNOR, BY MESNE ASSIGNMENTS, TO POTASH EXTRACTION CORPORATION, OF NEW YORK, N. Y., A CORPORATION OF NEW YORK.

METHOD OF TREATING POTASSIUM-BEARING SILICATES.

1,285,121.　　　Specification of Letters Patent.　　Patented Nov. 19, 1918.

No Drawing.　　Application filed March 8, 1915.　Serial No. 12,923.

*To all whom it may concern:*

Be it known that I, WALTER GLAESER, a subject of the German Emperor, and a resident of Brooklyn, county of Kings, State of New York, have invented a new and useful Improvement in Methods of Treating Potassium-Bearing Silicates, (Case 3), of which the following is a specification, the principle of the invention being herein explained and the best mode in which I have contemplated applying that principle, so as to distinguish it from other inventions.

The present improvements relate in general to the treatment of potassium-bearing silicates and particularly to a method of treating such silicates to secure the potassium therein in the form of water soluble salts which are available for fertilizers and also to obtain the resulting waste material in the form of valuable by-products. My method accomplishes both these objects, and in fact may be directed primarily, if desired, to the manufacture of the other products which are also valuable and commercially important. To the accomplishment of the foregoing and related objects, said invention then, consists of the means hereinafter fully described and particularly pointed out in the claims.

The following description sets forth in detail one approved method of carrying out the invention, such disclosed mode, however, constituting but one of the various ways in which the principle of the invention may be used.

The potassium bearing silicates will first be broken into lump form and heated for a considerable period, preferably about two hours, at a low red heat, which is equivalent to a temperature of approximately 800° C. The silicates, after being thus treated, are chilled suddenly, preferably by treatment of the same in water, thus breaking up the lumps to some extent and rendering the silicates much more available for grinding and for future treatment. The resulting material is then ground preferably to the fineness of a 40-mesh screen.

The preliminary treatment of the silicate as described above is not in itself new and has been used before for the purpose of disintegrating the silicate and rendering it in a condition to be further crushed or treated. Obviously if the silicate undergoing treatment is already in a finely divided condition, or is in such a condition that it can be readily ground or crushed to a suitable fineness, then it will not be necessary to put the material through the preliminary treatment.

The silicate in this finely divided form is then mixed with burnt lime and carbon, in the form of powdered coke, and will then preferably be formed into briquets, using as little water as possible, in the proportions of 100 parts of silicate to 30 parts or less of burnt lime, with of course a suitable amount of the powdered coke. The briquets, which when first formed are moist, are then air dried and the mixture is then ready for the final step in the treatment.

The briquets are placed in a suitable furnace and are there subjected to a temperature in excess of 700° C. This heating is carried on in the presence of steam and air, and produces three separate and distinct reactions, the first of which may be indicated by the following equation:—

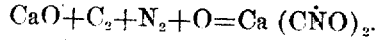

$$CaO + C_2 + N_2 + O = Ca(CNO)_2.$$

The calcium cyanate, which is formed as the first product of the reaction, is immediately decomposed by the steam into ammonia and calcium bicarbonate, according to the following equation:—

$$Ca(CNO)_2 + 4H_2O = 2NH_3 + Ca(HCO_3)_2.$$

The calcium bicarbonate which is thus formed is, upon further heating, broken up into lime, or rather carbonic acid, according to the following equation:—

$$Ca(HCO_3)_2 = CaO + H_2O + 2CO_2.$$

The water which is thus formed, together with the steam in the furnace and the carbonic acid, react upon the silicate to form soluble potassium carbonate, this reaction being caused by the nascent state of the carbonic acid and by reason of the presence of a contact substance, which in this instance is the undecomposed silicate and the coke and lime.

Ammonia is produced only until the coke is entirely consumed, but the amount of lime is constantly being added to, as will be indicated by the third equation, showing the breaking up of the calcium bicarbonate, and it will react upon the ignited silicate, in this way materially assisting in the decomposition of the latter, with the formation, as one of the products, of calcium silicate. The resulting clinker from the heating may be used as a fertilizer since it contains potassium carbonate, which is of course soluble in water.

The present method of treating potassium bearing silicates may be used either for the production of ammonia with available potassium fertilizers as by-products, or it may be directed primarily to the production of water-soluble potassium salts with ammonia as a by-product, and in either case affords a method of securing the constituents of potassium-bearing silicates in a usable and commercially valuable form.

Other modes of applying the principle of my invention may be employed instead of the one explained, change being made as regards the process herein disclosed or the materials employed in carrying out the process, provided the step or steps stated by any of the following claims or the equivalent of such stated step or steps be employed.

I therefore particularly point out and distinctly claim as my invention:

1. In a method of treating potassium bearing silicates, the steps which consist in heating the silicate, cooling the same suddenly, intimately mixing the resulting material with burnt lime and carbon in the proportions of approximately 100 parts of silicate to 30 parts of lime, and then heating such mixture in the presence of steam and air at a temperature above 700 degrees C.

2. In a method of treating potassium bearing silicates, the steps which consist in heating the silicate, cooling the same suddenly, intimately mixing the resulting material with burnt lime and carbon in the proportions of 100 parts of silicate to 30 parts of lime, and then heating such mixture in the presence of steam and air at a temperature above 700 degrees C. until all of the carbon present is consumed, thereby producing ammonia and potassium carbonate.

3. In a method of treating potassium bearing silicates, the steps which consist in heating the silicate, cooling the same suddenly, intimately mixing the resulting material with burnt lime and carbon, and then heating such mixture in the presence of steam and air at above 700° C.

4. In a method of treating potassium bearing silicates, the steps which consist in heating the silicate, cooling the same suddenly, intimately mixing the resulting material with burnt lime and carbon, and then heating such mixture in the presence of steam and air at above 700° C. until all of the carbon present is consumed, thereby producing ammonia and potassium carbonate.

5. In a method of treating potassium bearing silicates, the steps which consist in heating the silicate in lump form to approximately 800° C., cooling the same suddenly, intimately mixing the resulting material with burnt lime and coke in the proportions of 100 parts of silicate to 30 parts of lime, briqueting such mixture, and then heating the same in the presence of steam and air at a temperature above 700° C.

6. In a method of treating potassium-bearing silicates, the step which consists in heating finely divided silicate with burnt lime and carbon in the presence of steam and air at a temperature above 700 degrees C.

Signed by me, this 16th day of February, 1915.

WALTER GLAESER.

Attested by—
J. J. DOYLE,
E. A. GANNON.